United States Patent [19]
deVries

[11] Patent Number: 5,361,687
[45] Date of Patent: Nov. 8, 1994

[54] CORRUGATION-ENHANCED BAKING PAN

[75] Inventor: Jouke deVries, Corapolis, Pa.

[73] Assignee: Bundy Industries, Inc., Coraopolis, Pa.

[21] Appl. No.: 46,141

[22] Filed: Apr. 15, 1993

[51] Int. Cl.⁵ ............................................. A47J 37/01
[52] U.S. Cl. ........................................ 99/426; 99/432; 249/119
[58] Field of Search ............... 99/426, 432, 433, 428, 99/422; 249/DIG. 1, 120, 119; 220/654, 651; 206/564, 551

[56] References Cited

U.S. PATENT DOCUMENTS

| | | | |
|---|---|---|---|
| 1,084,790 | 1/1914 | Cohn | 99/428 |
| 1,411,128 | 3/1922 | Strobhart | 99/433 |
| 1,464,792 | 8/1923 | Wierth | 249/120 |
| 2,583,887 | 1/1952 | Schneeweiss | 99/433 |
| 4,009,859 | 3/1977 | Bangert | 249/DIG. 1 |
| 4,047,477 | 9/1977 | Berke | 99/428 |
| 4,296,682 | 10/1981 | Thompson | 99/426 |
| 4,941,585 | 7/1990 | Hare et al. | 99/432 |

*Primary Examiner*—David A. Scherbel
*Assistant Examiner*—Reginald Alexander
*Attorney, Agent, or Firm*—Jason E. Hardiman

[57] ABSTRACT

A pan used to contain baked goods during a commercial baking process having a circumferential edge flange which is along a same horizontal plane as molds which make up the bottom of the pan, thereby providing added support to the pan when in use during the baking process and while it is stacked on top of other pans for storage purposes. The pan also having a circumferential corrugation feature which increases the ability of the edge flange to withstand shearing and bending stress.

6 Claims, 4 Drawing Sheets

CORRUGATION-ENHANCED BAKING PAN

BACKGROUND OF THE INVENTION

1. Field of the Invention

The present invention relates to pans used for the containment of baked goods during the preparation process in the commercial baking industry.

2. Description of the Prior Art

Pans have been used throughout the baking industry for the containment of baked goods during the preparation process. The durability of baking pans used in an automated commercial baking process has been less than desirable. Previous baking pans have disclosed molds stamped into one side of the pan for containing baked goods. They have also disclosed supporting wires running along and engaging the edges of the baking pan. During the baking process, the molds of these pans have ridden on shelves and oven surfaces, providing the exclusive means of support for the pan. Due to the mechanical rigors of an automated commercial baking process, which is characterized by high speed transport of the pans, the molds have a tendency to deform over time. The deformation undermines the support capacity of the molds. The deformation also destroys the configuration of the molds which is necessary to provide an appealing and marketable baked good. The deformation renders the pans prematurely useless.

Previous baking pans have disclosed the ability to be stacked one on top of another for storage purposes. When stacked, the supporting wires and edge flanges of the pans ride one on top of another. These flanges and wires provide the exclusive means of support for the pans while they are stacked. Over time, the flanges have a tendency to bow under the weight of the stacked pans. The bowing bends the entire baking pan. The resulting deformation destroys the pans' ability to be subject to the high speed transport necessary in an automated commercial baking process. The deformation also destroys the configuration of the molds which is necessary to provide an appealing and marketable baked good.

The bowing of the edge flange also inhibits the operation of an indexer. An indexer is a device which controls the motion and progression of a pan through an automated baking process. The indexer physically engages the edge flange of a baking pan to determine the pan's location during the baking process. If the edge flange bows out of position, the indexer cannot physically engage it and determine the location of the pan. The pan can no longer be used in an automated baking process. The bowing of the edge flange and the resulting pan deformation renders the pans prematurely useless.

SUMMARY OF THE INVENTION

The object of the present invention is to increase the durability of pans used in automated commercial baking processes. The present invention embodies a baking pan comprising molds of a desired depth and configuration stamped into the base of the pan and a supporting wire running along and engaging the edge flange of the pan. The edge flange runs along the same plane as the bottoms of the molds. Hence the baking pan has two means of support when it is resting on a flat surface such as the shelf of an oven. One means of support is the wire supported edge flange. The other means is the mold or molds. The molds, not being the exclusive means of support, are less likely to deform. The decreased likelihood of deformation increases the useful life of the pan.

When the corrugation-enhanced pans are stacked one of top of another, the edge flanges of the stacked pans rest on the edge flanges of the pans beneath them. The bottommost pan edge flange rests on whatever flat surface the pans are stacked upon. The edge flange of the bottommost pan does not support the weight of the pans stacked above it. Rather, the flat surface upon which the bottommost pan rests supports the weight of the stacked pans. Hence, the edge flange of the bottommost pan does not have a tendency to bow under the weight of the stacked pans.

The present invention embodies a corrugation feature located between the center of the pan where the molds are located and the edge flange of the pan. The corrugation feature is a structural hump or bend which is stamped into the base of the pan. The feature is inherently stronger than the flat area which would exist between the center of the pan and the edge flange of the pan if the corrugation feature was not stamped in its place. The corrugation feature has a higher tolerance shearing stress and bending stress than the flat area it replaces. The corrugation feature because it is stamped out of the base, has the same cross-sectional area of the flat area it replaces. The distance between the centroid of the corrugation feature and the bottom of the pan is greater than the distance between the centroid of the flat area and the bottom of the pan. Therefore, both the first moment of the area or shearing stress tolerance and the second moment of the area (moment of inertia) or bending stress tolerance is greater in the corrugation feature than in the flat area it replaces.

When the corrugation-enhanced pan is stacked one on top of another, the additional strength of the corrugation feature decreases the tendency of the edge flange and the supporting wire to bow under the weight of the stacked pans. The decreased tendency to bow decreases the tendency for the pan to bend and deform as a whole. The decreased likelihood of deformation increases the useful life of the pan.

DESCRIPTION OF THE PREFERRED EMBODIMENT

Figure 1:
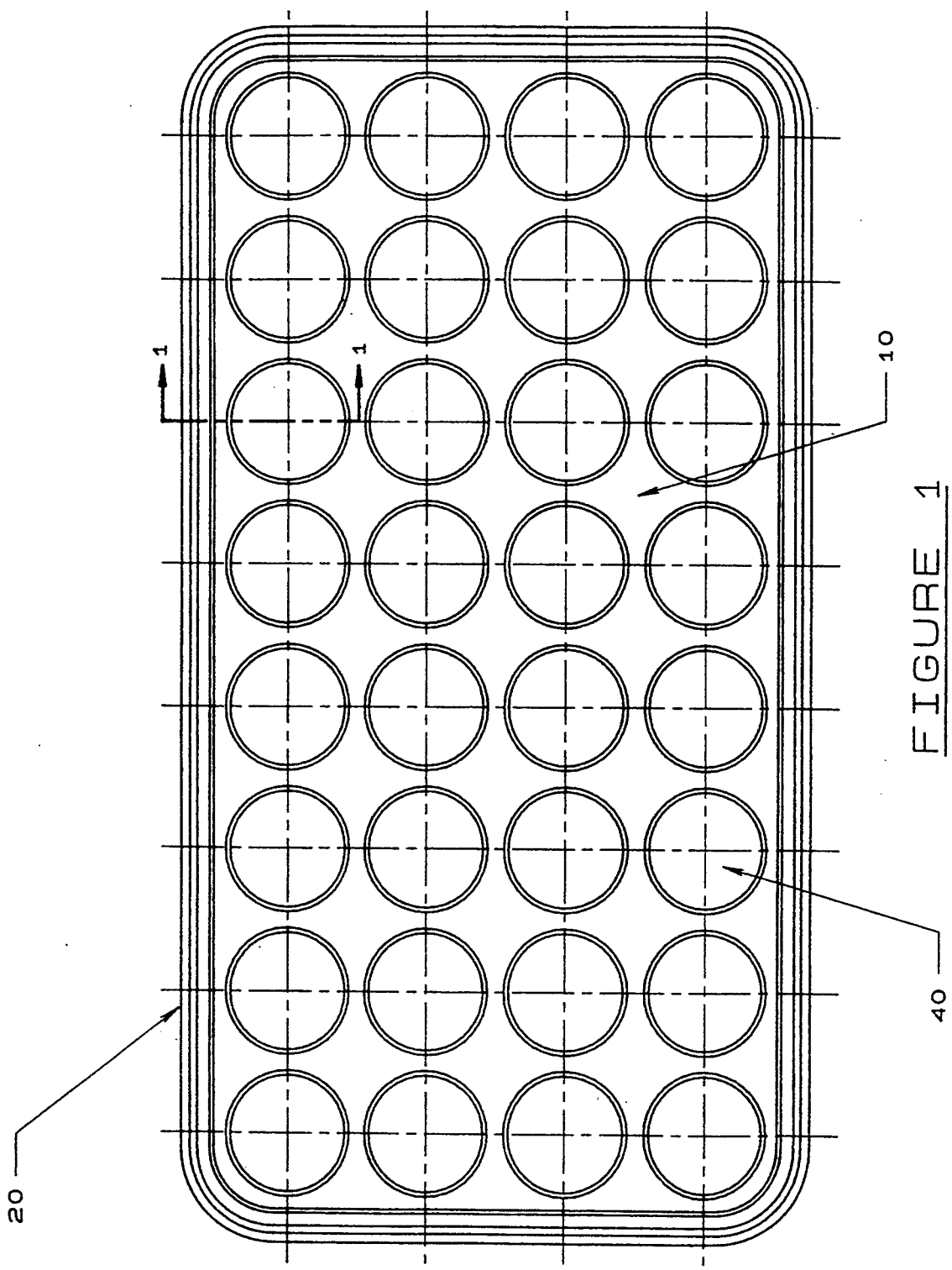
FIG. 1 is a top plan view of the ]present invention.
Figure 2:
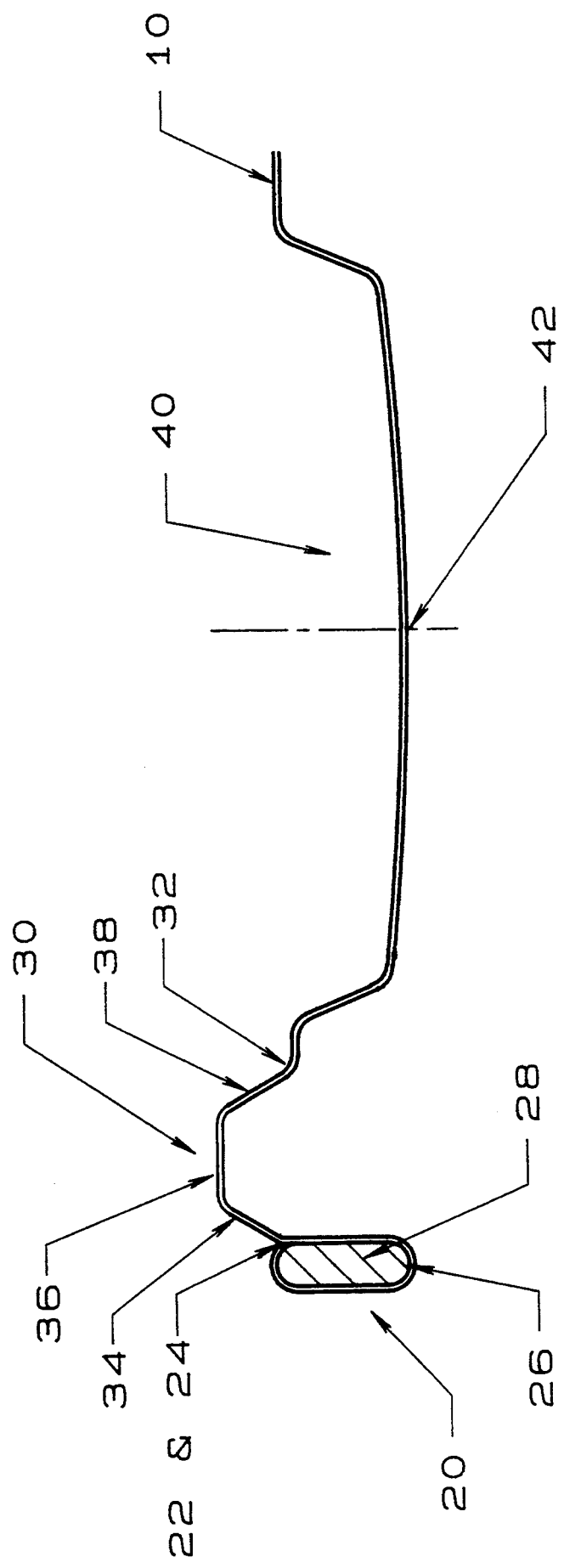
FIG. 2 is a cross-sectional view of the preferred embodiment of the present invention taken along line 1—1 of FIG. 1.

Referring to FIGS. 1 and 2, the rectilinear, planar sheet of material 10 is a sheet of steel. Referring to FIG. 2, the edge flange 20 of material sheet 10 encompasses the area between the entire outer circumference 22 of material sheet 10 and circumference 24 which is within the outer circumference 22. The edge flange 20 is rolled over such that the outer circumference 22 meets the circumference 24 and forms a cavity 26 which is elliptical in cross-sectional configuration. Edge flange 20 is bent over at circumference 24 such that the line formed by the two centroids of the elliptical configuration of edge flange 20 is perpendicular to material sheet 10. The direction in which edge flange 20 is bent defines the bottom of the invention. Within cavity 26 is located wire 28 which is elliptical in cross-sectional configuration. Wire 28 is slightly smaller in cross-sectional size than cavity 26. This facilitates the fitting of wire 28 snugly inside cavity 26. Wire 26 runs throughout the entirety of cavity 26.

Figure 3:
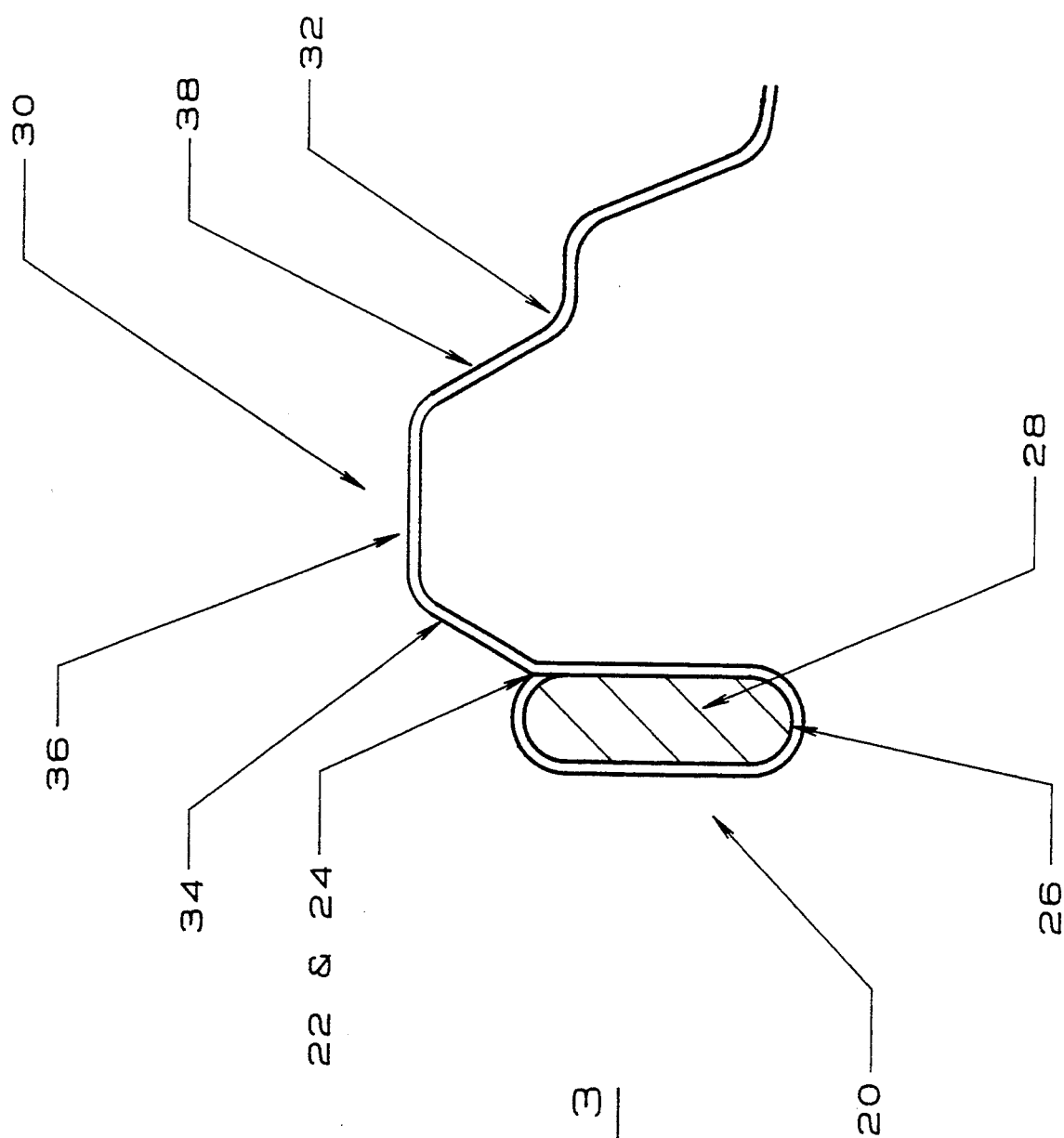
FIG. 3 is an enlarged cross-sectional view of the preferred embodiment of the present invention taken along line 1—1 of FIG. 1.
Figure 4:
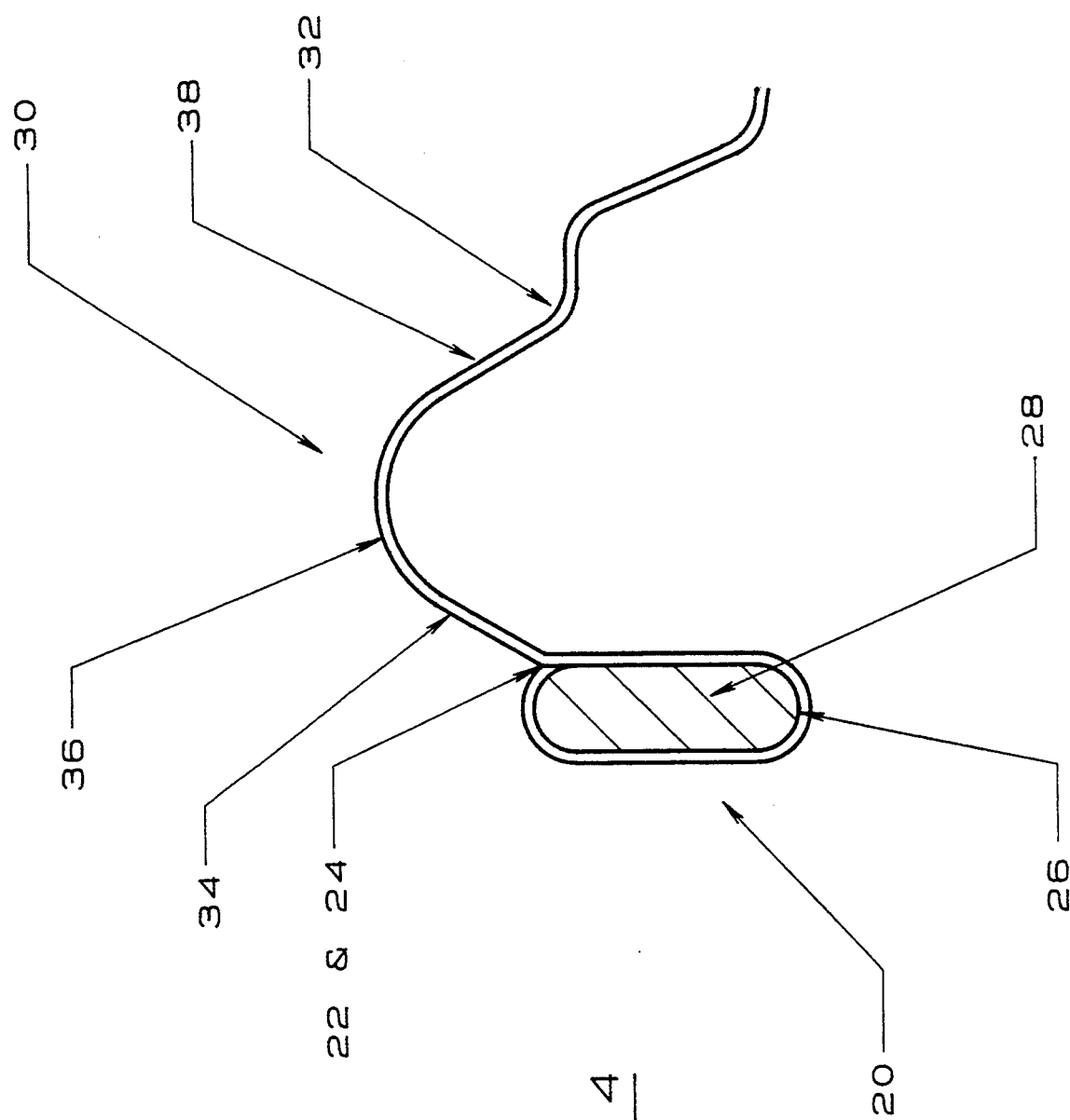
FIG. 4 is an enlarged cross-sectional view of an alternate embodiment of the present invention taken along line 1—1 of FIG. 1.

Referring to FIGS. 2 and 3, the corrugation 30 encompasses the area between circumference 24 and circumference 32 which is located within circumference 24. Referring to FIG. 2, corrugation 30 is stamped into this area of material sheet 10 in a direction opposite the bend of edge flange 20, forming a concavity when viewed from the bottom of the invention. In its preferred embodiment, corrugation 30 is trapezoidal in cross-sectional configuration. In an alternate embodiment, referred to in FIG. 4, corrugation 30 is hyperbolic in cross-sectional configuration. The outer side 34 of the corrugation engages circumference 24 and the top side 36 of the corrugation. The inner side 38 of the corrugation engages top side 34 and circumference 32. The top side 36 of the corrugation is parallel to material sheet 10.

Referring to FIGS. 1 and 2, molds 40 are stamped into the area of material sheet 10 within circumference 32 of material sheet 10. Referring to FIG. 2, molds 40 are convex when viewed from the bottom of the invention. The bottom 42 or convexed portions of the molds 40 are located on the same horizontal plane as the bottom of edge flange 20.

I claim:

1. A pan for containing baked goods throughout the baking process comprising:
   a. a rectilinear, planar sheet of material having:
      i. an edge flange encompassing a circumference of the material sheet, the edge flange rolled upon itself to form a cavity;
      ii. a corrugation stamped into the material sheet and extending from the edge flange, the corrugation encompassing a circumference of the material sheet within a circumference of the edge flange;
      iii. at least one mold stamped into and extending opposite the corrugation, on a planar side of the material sheet, the mold located within an interior circumference created by the corrugation and having a base located on a horizontal plane with the edge flange; and
   b. a wire of a cross-sectional size and shape smaller than that of the edge flange cavity, located throughout an entirety of the edge flange cavity.

2. A pan for containing baked goods throughout the baking process comprising:
   a. a rectilinear., planar sheet material having:
      i. an edge flange encompassing a circumference of the material sheet, the edge flange rolled upon itself to form a cavity;
      ii. a corrugation stamped into the material sheet and extending from the edge flange, the corrugation encompassing a circumference of the material sheet within a circumference of the edge flange;
      iii. at least one mold stamped into and extending opposite the corrugation, on a planar side of the material sheet, the mold located within an interior circumference created by the corrugation and having a base located on a horizontal plane with the flange;
   the corrugation being trapezoidal in configuration, the corrugation having a top side parallel to the horizontal plane, an outer side extending to and engaging the edge flange and an inner side extending to and engaging an area on the material sheet located within the interior circumference created by the corrugation; and
   b. a wire of a cross-sectional size and shade smaller than that of the edge flange cavity, located throughout an entirety of the edge flange cavity.

3. A pan for containing baked goods throughout the baking process comprising:
   a. a rectilinear, planar sheet of material having:
      i. an edge flange encompassing a circumference of the material sheet, the edge flange rolled upon itself to form a cavity;
      ii. a corrugation stamped into the material sheet and extending from the edge flange, the corrugation encompassing a circumference of the material sheet within a circumference of the edge flange;
      iii. at least one mold stamped into and extending opposite the corrugation, on a planar side of the material sheet, the mold located within an interior circumference created by the corrugation and having a base located on a horizontal plane with the flange;
   the corrugation being hyperbolic in configuration, the corrugation being concave in relation to the horizontal plane, an outer side extending to and engaging the edge flange and an inner side extending to and engaging an area on the material sheet located within the interior circumference created by the corrugation; and
   b. a wire of a cross-sectional size and shape smaller than that of the edge flange cavity, located throughout an entirety of the edge flange cavity.

4. The pan of claim 1 wherein the rectilinear, planar sheet of material is a rectilinear, planar sheet of steel.

5. The pan of claim 2 wherein the rectilinear, planar sheet of material is a rectilinear, planar sheet of steel.

6. The pan of claim 3 wherein the rectilinear, planar sheet of material is a rectilinear, planar sheet of steel.

* * * * *